(12) United States Patent
Han

(10) Patent No.: US 9,628,288 B2
(45) Date of Patent: Apr. 18, 2017

(54) APPARATUS FOR CONTROLLING NETWORK TRAFFIC

(71) Applicant: LSIS CO., LTD., Anyang-si, Gyeonggi-do (KR)

(72) Inventor: Seung Shin Han, Ansan-si (KR)

(73) Assignee: LSIS CO., LTD., Anyang-si (KR)

( * ) Notice: Subject to any disclaimer, the term of this patent is extended or adjusted under 35 U.S.C. 154(b) by 275 days.

(21) Appl. No.: 14/285,348

(22) Filed: May 22, 2014

(65) Prior Publication Data

US 2015/0063109 A1    Mar. 5, 2015

(30) Foreign Application Priority Data

Aug. 29, 2013 (KR) .................... 10-2013-0103506

(51) Int. Cl.

| | |
|---|---|
| H04L 12/40 | (2006.01) |
| H04L 12/823 | (2013.01) |
| H04L 12/825 | (2013.01) |
| H04L 12/801 | (2013.01) |
| H04L 29/08 | (2006.01) |

(Continued)

(52) U.S. Cl.
CPC .... *H04L 12/40084* (2013.01); *H04L 12/4015* (2013.01); *H04L 12/40019* (2013.01); *H04L 12/40143* (2013.01); *H04L 43/0852* (2013.01); *H04L 47/16* (2013.01); *H04L 47/25* (2013.01); *H04L 47/32* (2013.01); *H04L 67/12* (2013.01); *H04J 3/0638* (2013.01); *H04L 2012/40215* (2013.01)

(58) Field of Classification Search
CPC .......... H04L 12/40143; H04L 12/4015; H04L 2012/40215; H04L 12/40084; H04L 12/40019

See application file for complete search history.

(56) References Cited

FOREIGN PATENT DOCUMENTS

| | | |
|---|---|---|
| EP | 1158699 | 11/2001 |
| EP | 1313274 | 5/2003 |

(Continued)

OTHER PUBLICATIONS

Korean Intellectual Property Office Application Serial No. 10-2013-0103506, Notice of Allowance dated Nov. 14, 2014, 2 pages.

(Continued)

*Primary Examiner* — Omer S Mian
(74) *Attorney, Agent, or Firm* — Lee, Hong, Degerman, Kang & Waimey

(57) ABSTRACT

An apparatus for controlling network traffic is provided. The apparatus includes: a data object service providing module generating a data check service frame; a message service providing module generating a data transmission service frame; a frame delay module adjusting a generation period of the data check service frame generated by the data object service providing module; a traffic analysis module comparing a data transmission amount of the data transmission service frame generated by the message service providing module with a reference data transmission amount, wherein the traffic analysis module determines a generation period of the data check service frame according to a comparison result, and controls the operation of the frame delay module according to a determined generation period; and a transmit queue transmitting a service frame transmitted from the traffic analysis module to a control area network open (CANopen) network.

4 Claims, 3 Drawing Sheets

(51) Int. Cl.
  *H04L 12/26*   (2006.01)
  *H04J 3/06*    (2006.01)

(56)         References Cited

FOREIGN PATENT DOCUMENTS

JP      2006-229887      8/2006
JP      2006-287571      10/2006
KR      10-2009-0007846  1/2009
WO      2008/076017      6/2008

OTHER PUBLICATIONS

Japan Patent Office Application Serial No. 2014-120218, Office Action dated Mar. 19, 2015, 3 pages.
European Patent Office Application Serial No. 14175504.1, Search Report dated Jan. 28, 2015, 8 pages.
CAN in Automation, "CANopen Application Layer and Communication Profile CiA Draft Standard 301, Version 4.02," XP002366717, Feb. 2002, 135 pages.
Farsi, et al., CANopen: "Configure and Device Testing," Factory Communications Systems, 1997 Proceedings, 1997 IEEE International Workshop on Barcelona, XP010255520, Oct. 1997, pp. 373-380.

APPARATUS FOR CONTROLLING NETWORK TRAFFIC

CROSS-REFERENCE TO RELATED APPLICATIONS

Pursuant to 35 U.S.C. §119(a), this application claims the benefit of earlier filing date and right of priority to Korean Patent Application No. 10-2013-0103506, filed Aug. 29, 2013, the contents of which are all hereby incorporated by reference herein in its entirety.

BACKGROUND

The present disclosure relates to an apparatus for controlling network traffic, and more particularly, to an apparatus for controlling network traffic that may prevent the data transmission delay of a network.

A control area network (CAN) is a two-wire serial communication bus that is an industry standard widely used for automobiles and industrial control applications in addition to medical equipment, avionics, office automation facilities, consumer products, other many products and applications. A CAN controller may be currently used as a stand-alone device configured to interface with a micro controller, a circuit integrated into a micro controller chip or a module inserted thereinto.

Since 1986, CAN users (software programmers) have developed a plurality of high-level CAN application layers (CALs) that expand the functions of the CAN, using CAN physical layers and CAN frame formats and supporting CAN specifications. CANopen is one of the CALs which is a protocol supporting the CAN, and is also being used for managing and monitoring programmable logic controller (PLC) equipment in various industrial fields. As the usage of a CANopen network is expanded, there is a need to prevent the data transmission delay of the CANopen network.

SUMMARY

Embodiments provide an apparatus for controlling network traffic that may adjust a data transmission amount according to the transmission capacity of a control area network open (CANopen) network.

Additional aspects will be set forth in part in the description which follows and, in part, will be apparent from the description, or may be learned by practice of the presented embodiments.

In one embodiment, an apparatus for controlling network traffic includes: a data object service providing module generating a data check service frame; a message service providing module generating a data transmission service frame; a frame delay module adjusting a generation period of the data check service frame generated by the data object service providing module; a traffic analysis module comparing a data transmission amount of the data transmission service frame generated by the message service providing module with a reference data transmission amount, wherein the traffic analysis module determines a generation period of the data check service frame according to a comparison result, and controls the operation of the frame delay module according to a determined generation period; and a transmit queue transmitting a service frame transmitted from the traffic analysis module to a control area network open (CANopen) network.

According to an embodiment, a master device configuring the CANopen network may compare a data transmission schedule according to a user input with the transmission capacity of the CANopen network to adjust a data transmission amount.

The details of one or more embodiments are set forth in the accompanying drawings and the description below. Other features will be apparent from the description and drawings, and from the claims.

DETAILED DESCRIPTION OF THE EMBODIMENTS

Figure 1:
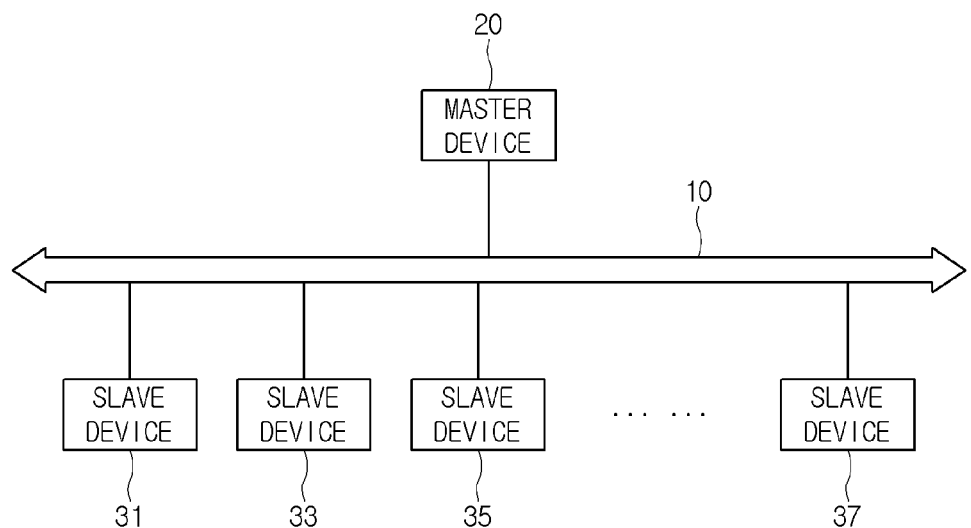
FIG. 1 is a schematic diagram of a control area network open (CANopen) network according to an embodiment.

The followings only illustrate the principle of the present invention. Therefore, a person skilled in the art may invent various devices that implement the principle of the present invention and are included in the concept and scope of the present invention, although being not clearly described or shown in the specification. Also, all conditional terms and embodiments enumerated in the specification are, in principle, intended only for the purpose of understanding the concept of the present invention and thus it should be understood that the present invention is not limited to embodiments and state to be particularly enumerated.

Also, it should be understood that all detailed descriptions enumerating specific embodiments as well as the principle, view and embodiments of the present invention are intended to include their structural and functional equivalents. Also, such equivalents should be understood as including currently known equivalents as well as equivalents to be developed in future, namely, all elements invented to perform the same function irrespective of their structures.

Thus, for example, block diagrams used herein should be understood as representing the concept of an exemplary circuit that embodies the principle of the present invention. Likewise, all flow charts, state transition diagrams, and pseudo codes should be understood as representing various processes that may be substantially represented on computer readable mediums and are performed by computers or processors irrespective of whether the computers or the processors are clearly shown.

The functions of various elements shown in drawings including a processor or a functional block represented as concept similar to the processor may be provided by using dedicated hardware and hardware having an ability to execute software in terms of appropriate software. When being provided by a processor, such functions may be provided by a single dedicated processor, a single shared processor, or a plurality of individual processors of which some may be shared.

Also, the clear usage of a processor, control or a term presented as concept similar to those should not be interpreted as exclusive citation of hardware having an ability to execute software, but be understood as implicitly including a digital signal processor (DSP) hardware, a ROM for storing software, a RAM, and a non-volatile memory without limitation. Other known and common hardware may also be included.

In the following claims, components expressed as means for performing functions described in the detailed description are intended as including, for example, combinations of circuit elements performing the functions or all methods performing functions including all types of software including firmware/micro codes, and are combined with appropriate circuits for executing the software to perform the functions. Since the present invention defined by such claims follows a rule needed by claims and functions provided by various enumerated means are combined, it should be understood that any means capable of providing the functions are equivalent to matters grasped from the specification.

The above objects, characteristics, and advantages will be clear through the following detailed description related to the accompanying drawings and thus a person skilled in the art will be able to easily practice the technological spirit of the present invention. In describing the present invention, detailed descriptions of known techniques related to the present invention will be ruled out in order not to unnecessarily obscure subject matters of the present invention.

Exemplary embodiments of the present invention are described below in detail with reference to the accompanying drawings.

FIG. 1 is a schematic diagram of a control area network open (CANopen) network according to an embodiment.

Referring to FIG. 1, a CANopen network 10 includes one master device 20 and a plurality of slave devices 31, 33, 35 and 37. The CANopen network 10 may include up to 126 slave devices 31, 33, 35 and 37.

In this case, data communication may be performed only between the master device 20 and at least one of the plurality of slave devices 31, 33, 35 and 37 that configure the CANopen network 10.

Figure 2:
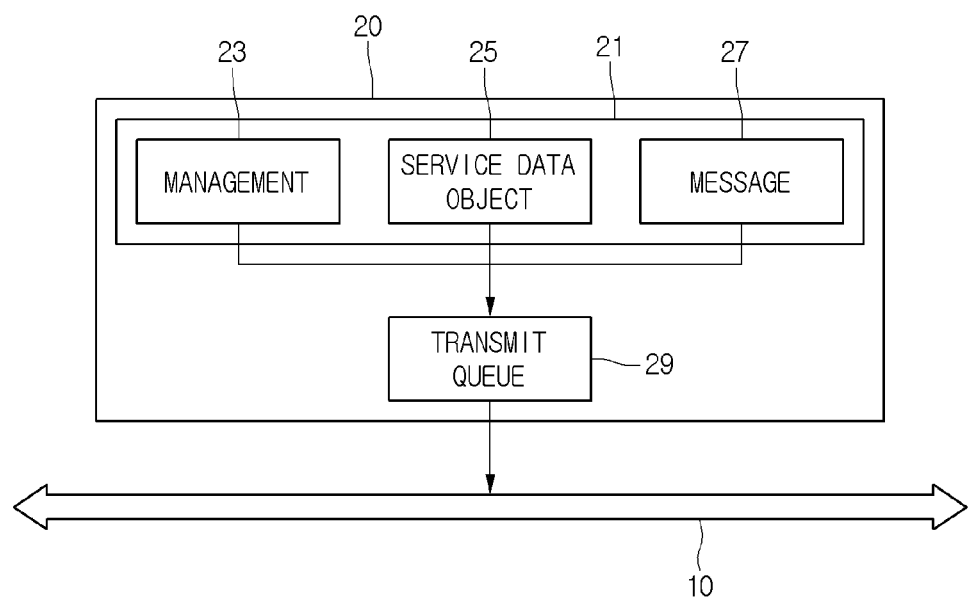
FIG. 2 is a schematic diagram of a master device in a CANopen network according to an embodiment.

FIG. 2 is a schematic diagram of a master device in a CANopen network according to an embodiment.

Referring to FIG. 2, the master device 20 transmits data to the CANopen network 10 through a transmit queue 29.

The master device 20 may provide a network management (NMT) service, a service data object (SDO) service, and a message service. That is, the master device 20 may set up the CANopen network and manage a data transmission schedule through a management service providing module 23, a SDO service providing module 25, and a message service providing module 27.

The management service providing module 23 may manage the state of at least one of modules configuring the CANopen network.

The SDO service providing module 25 may modify or check any data. Also, the SDO service providing module 25 may also modify or check at least one data value by using modified or checked data and also modify or check the setting of CANopen network communication but it is not limited thereto.

The message service providing module 27 may transmit data regularly (Time-Driven) or when a specific event arises (Event-Driven) but it is not limited thereto.

The transmit queue 29 may store a frame performing each service that is transmitted from each of the management service providing module 23, the SDO service providing module 25, and the message service providing module 27, may sequentially transmit a stored frame to the CANopen network 10. In this case, each of the management service providing module 23, the SDO service providing module 25, and the message service providing module 27 generates a frame suitable for a corresponding service standard. As a result, the master device 20 may transmit the frame suitable for the corresponding service to the CANopen network 10 through the transmit queue 29.

Figure 3:
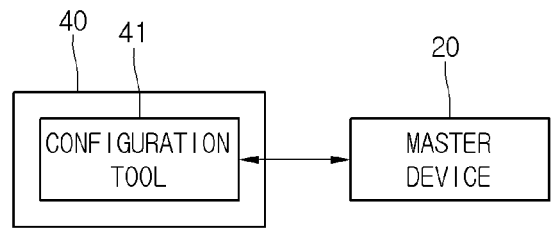
FIG. 3 is a diagram for explaining the operation of a master device in a CANopen network according to an embodiment.

FIG. 3 is a diagram for explaining the operation of a master device in a CANopen network according to an embodiment.

Referring to FIG. 3, the master device 20 may use a configuration tool 41 installed in a PC 40 to perform auto scan or real-time data monitoring.

The master device 20 may check information on each of the plurality of slave devices 31, 33, 35 and 37 connected to the CANopen network 10 through the auto scan function that the configuration tool 41 provides. In this case, the master device 20 may use the configuration tool 41 installed in the PC 40 through the above-described SDO service providing module 25. That is, the master device 20 may use the configuration tool 41 to set up and download the configuration or data transmission schedule of the CANopen network.

By using this method, the master device 20 may manage the CANopen network 10 and transmit the data transmission schedule to the slave devices 31, 33, 35 and 37. However, since the CANopen network 10 supports a bit rate of 10 kbps to 1 Mbps and the number of frames that the CANopen network 10 may hold decreases as in Table 1 as a bit rate becomes low, there may be cases where neither the auto scan and real-time data monitoring functions supported by the configuration tool 41 nor a data transmission function is normally performed. Table 1 represents bit rate vs. data transmission distance and maximum transmission byte length per second.

TABLE 1

| Bit Rate (bps) | Transmission Distance (m) | Maximum Transmission Byte Length per Second (N) |
|---|---|---|
| 10,000 | 5,000 | 1,000 |
| 20,000 | 2,500 | 2,000 |
| 50,000 | 1,000 | 5,000 |
| 125,000 | 500 | 12,500 |
| 250,000 | 250 | 25,000 |
| 500,000 | 100 | 50,000 |
| 800,000 | 50 | 80,000 |
| 1,000,000 | 25 | 100,000 |

Referring to FIG. 1, the CANopen network 10 limits a data transmission distance or a transmission byte length per second (i.e., a transmission amount) according to a preset bit rate.

In this case, the master device 20 needs to check in real time whether a network setup or data transmission schedule according to a user input exceeds the transmission capacity of the CANopen network. If the master device 20 may not check in real time whether the network setup or data transmission schedule according to the user input exceeds a data transmission amount that the CANopen network may hold, there may be cases where some data is not transmitted and thus a system does not normally operate.

Also, when the master device 20 performs the auto scan or data real-time monitoring further supported by the configuration tool 41, other services may be delayed because many SDO frames are quickly transmitted to the CANopen network 10 through the transmit queue, and due to queue overflow, other service frames may also be lost.

A master device of the CANopen network according to another embodiment and a method of operating the master device are described below with reference to FIGS. 4 to 6. According to another embodiment, it is possible to see whether the CANopen network may hold a transmission schedule set up according to a user input, and due to traffic for performing the auto scan and data real-time monitoring functions supported by the configuration tool, neither other services are delayed nor a transmit queue capacity is exceeded, so it is possible to prevent data loss.

Figure 4:
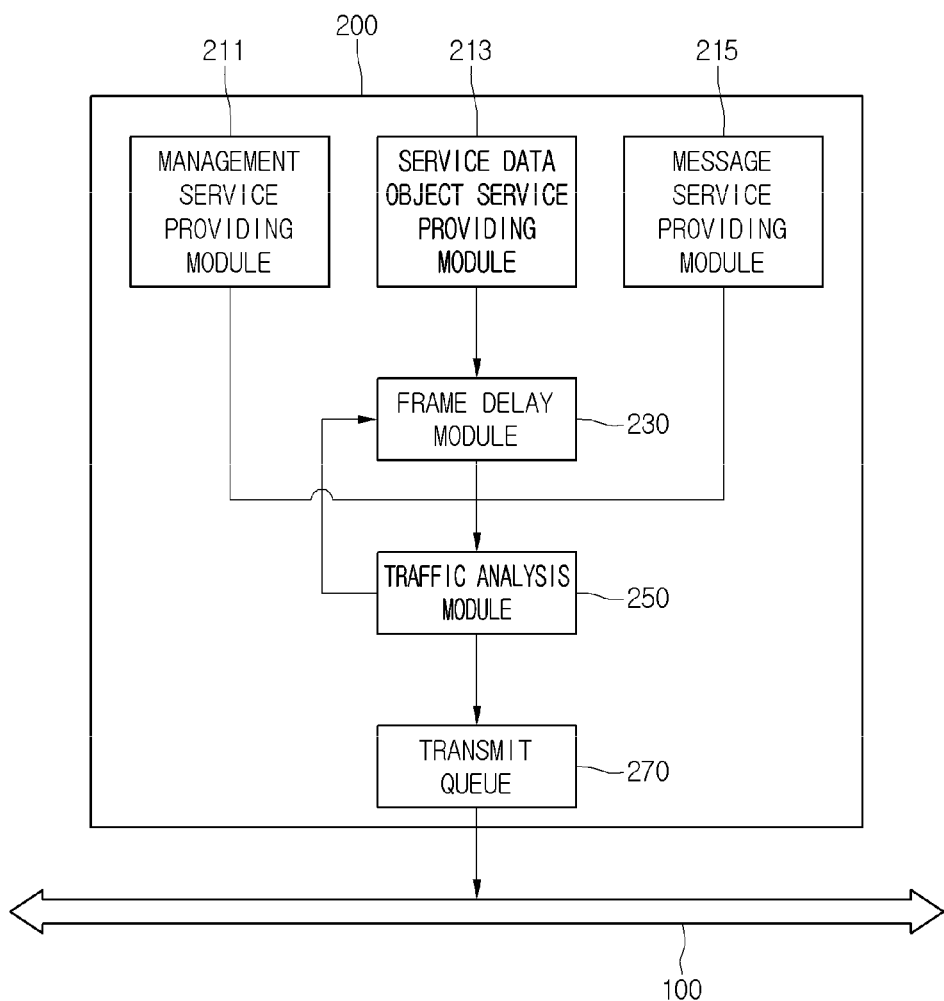
FIG. 4 is a schematic diagram of a master device in a CANopen network according to another embodiment.

FIG. 4 is a schematic diagram of a master device in a CANopen network according to another embodiment.

Referring to FIG. 4, the master device 200 of the CANopen network 100 according to an embodiment includes a management service providing module 211, a SDO service providing module 213, a message service providing module 215, an SDO frame delay module 230, a traffic analysis module 250 and a transmit queue 270 but is not limited thereto.

The master device 200 may transmit, to the traffic analysis module 250, each service frame generated through each of the management service providing module 211, the SDO service providing module 213, and the message service providing module 215.

The frame delay module 230 may add a delay time to a SDO service frame generated by the SDO service providing module 213. In this case, the frame delay module 230 may determine a delay time value to be added to the SDO service frame according to an analysis result of the traffic analysis module 250. The analysis result of the traffic analysis module 250 may be e.g., a frame transmission amount that the CANopen network 100 may hold, but is not limited thereto. By adding the delay time to the SDO service frame by the frame delay module 230, it is possible to prevent a frame from becoming generated to exceed the transmission capacity of the CANopen network 100.

The traffic analysis module 250 may examine whether each of the management service frame, the SDO service frame and the message service frame exceeds the transmission capacity of the CANopen network 100. The operation of the traffic analysis module 250 is described below with reference to FIG. 5. FIG. 5 shows how the traffic analysis module 250 calculates the number or length of the message service frames and compares a result with the transmission capacity of the CANopen network 100, but the present invention is not limited thereto.

Figure 5:
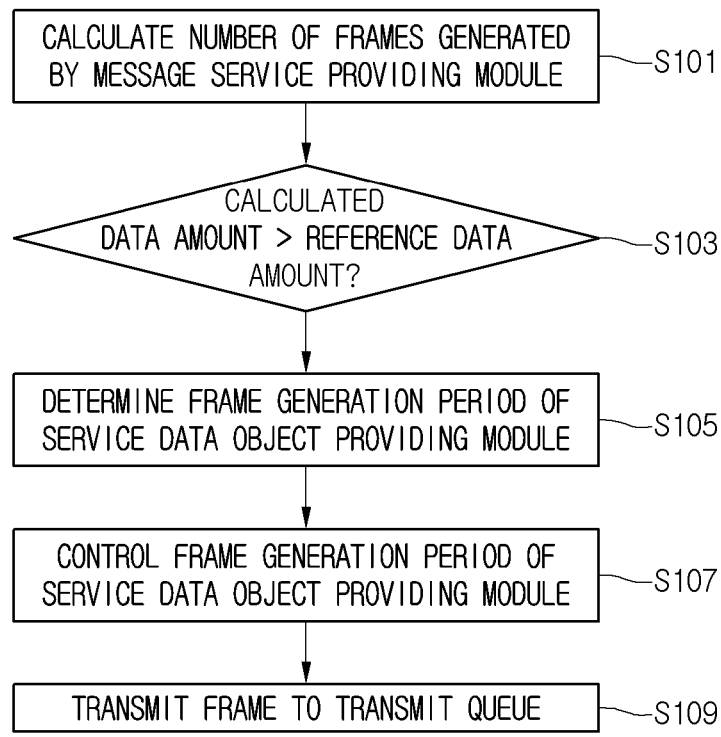
FIG. 5 is a flow chart of a method of controlling the traffic of a CANopen network according to an embodiment.

FIG. 5 is a flow chart of a method of controlling the traffic of a CANopen network according to an embodiment.

Referring to FIG. 5, the traffic analysis module 250 calculates the number of message service frames generated by the message service providing module 215 in step S101. The number of the message service frames may be calculated by Equation 1:

$$\sum_{a=1}^{n} \frac{1}{a^{th}PDO\ \text{Transmission Period}} + \frac{1}{SyncPeriod} + \sum_{b=1}^{m} \frac{1}{b^{th}\text{Node } ErrorControl\ \text{SetupTime}} \quad \langle\text{Equation 1}\rangle$$

where n is the number of process data object (PDO) service frames set up according to a user input,
$a^{th}$ is an ath PDO service frame,
the transmission period of an PDO where a transmission type is 0, 254, 255 is an Inhibit Time (second),
the transmission period of the PDO where the transmission type is 1 to 240 is the transmission type*Sync period (second),
m is the number of the nodes of slave devices where error control is set up, and
$b^{th}$ is a node of a bth slave device.

A method of calculating the number of message service frames according to an embodiment is described below with reference to FIG. 6.

Figure 6:
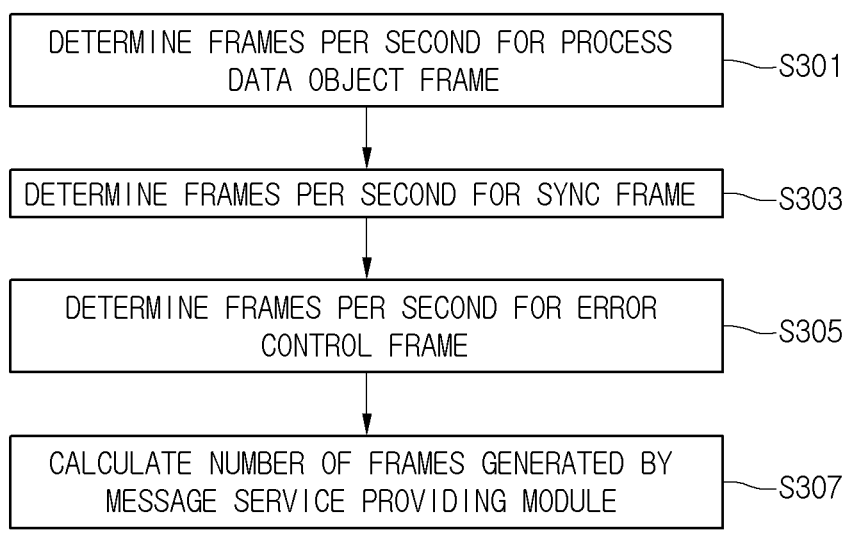
FIG. 6 is a flow chart of a method of calculating the number of transmission frames according to an embodiment.

FIG. 6 is a flow chart of a method of calculating the number of transmission frames according to an embodiment.

Referring to FIG. 6, the traffic analysis module 250 calculates frames per second for PDO service frames in step S301.

The master device 200 may perform a PDO service and transmit data. In this case, the frames per second for the PDO service frames may be determined by the number n of PDO service frames set up according to a user input and the transmission period a PDO service frame (a PDO transmission period).

Then, the traffic analysis module 250 determines frames per second for a sync frame in step S303.

The master device 200 may use a sync service to time-synchronize the master device with a slave device, and the sync service may be used to transmit data at regular time intervals. The frames per second for the sync frame may be determined by a sync period set up according to a user input.

Then, the traffic analysis module 250 determines frames per second for an error control frame in step S305.

The master device 200 may use an error control service in order to monitor the state of the slave device and the frames per second for the error control frame may be determined according to a period set up according to a user input.

Then, the traffic analysis module 250 adds up the frames per second for the PDO service frame, the frames per second for the sync frame, and the frames per second for the error control frame that are previously determined to calculate the number of frames generated by the message service providing module in step S307. The number of the frames generated by the message service providing module may be calculated through Equation 1 above, a plurality of terms configuring Equation 1 may mean the frames per second for the PDO service frame, the frames per second for the sync frame, and the frames per second for the error control frame, respectively.

Referring back to FIG. 5, the traffic analysis module 250 compares a previously calculated data amount with a reference data amount in step S103. The previously calculated data amount may mean the message service frame. The reference data amount may mean a data amount that may be held at the bit rate of a preset CANopen network 100, i.e., a data amount that the CANopen network 100 may transmit.

Then, the traffic analysis module 250 may use a comparison result determined previously to determine the frame generation period of the SDO service providing module 213 in step S105.

For example, when the previously calculated data amount exceeds the reference data amount, the traffic analysis module 250 may add a delay time to the SDO service frame. On the contrary, when the previously calculated data amount is less than the reference data amount, the traffic analysis module 250 may also calculate a data amount that the CANopen network 100 may further transmit and shorten the generation period of the SDO service frame.

Then, the traffic analysis module 250 transmits, to the frame delay module 230, information on a determined frame generation period to control the frame generation period of the SDO service providing module 213 in step S107. The frame delay module 230 may adjust the generation period of the SDO service frame for performing the auto scan and real-time data monitoring functions supported by the configuration tool 41, according to the control of the traffic analysis module 250.

Then, the traffic analysis module 250 transmits, to the transmit queue 270, a frame of which the period is controlled in step S109. By transmitting and storing a frame of which the transmission period is adjusted, the master device 200 may prevent the data transmission of the CANopen network 100 from becoming delayed.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An apparatus for controlling network traffic of a control area network open (CANopen) network, the apparatus connected to a configuration device and comprising:
   a data object service module generating a data check service frame for performing an auto-scan function according to instructions from the configuration device in order to check information on one or more slave devices of the CANopen network and a real-time monitoring of data traffic;
   a message service module generating a data transmission service frame;
   a traffic analysis module determining a generation period of the generated data check service frame according to a result of comparing an amount of data in the generated data transmission service frame with a reference data transmission amount, the amount of data in the generated data transmission service frame determined from a sum of data transmission service frames per second, sync frames per second, and error control frames per second;
   a frame delay module adjusting the generation period of the generated data check service frame according to the determined generation period;
   a transmit queue module transmitting the generated data check service frame to the CANopen network,
   wherein the traffic analysis module determines the generation period of the data check service frame by adding a delay time to the generation period when the amount of generated data exceeds the reference data transmission amount,
   wherein the traffic analysis module determines the generation period of the data check service frame by calculating a data amount that the CANopen network may further transmit and shortens the generation period of the data check service frame when the amount of generated data is less than the reference data transmission amount, and
   wherein the reference data transmission amount is an amount of data that is transmitted at a preset transmission speed of the CANopen network.

2. The apparatus according to claim 1, wherein the data transmission service frames per second is determined by a number of process data object (PDO) service frames set up according to a user input and a transmission period of the PDO service frames.

3. The apparatus according to claim 1, wherein:
   the sync frames per second is determined by a sync period set up according to a user input; and
   the sync period is used to perform a sync service for time-synchronizing a master device in the CANopen network with a slave device of the one or more slave device performing communication under control of the master device.

4. The apparatus according to claim 1, wherein the error control frames per second is determined by a period set up according to a user input.

* * * * *